US006031207A

United States Patent [19]

Dover et al.

[11] Patent Number: 6,031,207

[45] Date of Patent: Feb. 29, 2000

[54] SINTERING KILN

[75] Inventors: Bruce J. Dover, Lockport; Edward V. McCormick, Churchville, both of N.Y.

[73] Assignee: Harper International Corp., Lancaster, N.Y.

[21] Appl. No.: 09/237,748

[22] Filed: Jan. 26, 1999

[51] Int. Cl.[7] .......... A21B 1/00

[52] U.S. Cl. .......... 219/405; 219/388; 219/400; 219/390; 219/411; 373/109; 373/111; 373/112; 359/350; 392/418

[58] Field of Search .......... 219/388, 390, 219/405, 400, 411, 406, 410; 118/724, 629; 432/241; 392/416, 418; 373/109, 111, 112; 359/350

[56] References Cited

U.S. PATENT DOCUMENTS

| | | | |
|---|---|---|---|
| 3,414,661 | 12/1968 | Reed | 373/111 |
| 3,619,466 | 11/1971 | Athanis | 373/111 |
| 3,659,751 | 5/1972 | Jackson et al. | 222/194 |
| 4,208,573 | 6/1980 | Risse | 219/411 |
| 4,268,708 | 5/1981 | Smith, Jr. | 373/112 |
| 5,127,365 | 7/1992 | Koyama et al. | 118/724 |
| 5,467,220 | 11/1995 | Xu | 359/350 |
| 5,559,826 | 9/1996 | Ohtani et al. | 373/109 |
| 5,592,581 | 1/1997 | Okase | 392/418 |
| 5,767,486 | 6/1998 | Gronet et al. | 219/411 |
| 5,846,073 | 12/1998 | Weaver | 432/241 |
| 5,869,811 | 2/1999 | Benni et al. | 219/388 |

*Primary Examiner*—Teresa Walberg
*Assistant Examiner*—Leonid Fastovsky
*Attorney, Agent, or Firm*—James J. Ralabate; Arthur S. Cookfair

[57] ABSTRACT

A kiln, useful for sintering basemetal capacitors comprises an inner zone having vertically oriented gas dispersion conduits for the inlet and radial dispersion of gas and vertically oriented electrical heating elements. Each gas dispersion conduit comprises a porous or perforated inner tube for a porous or perforated outer tube concentrically positioned around the inner tube. The annular space between is filled with a porous refractory medium, such as a bulk ceramic fiber. The temperature of the inner zone is controlled by the electrical heating elements. The gas is evenly heated as it passes radially from the inner tube through the porous refractory medium and then through the outer tube. Surrounding the inner zone is a multiplicity of stacks of substantially horizontally-oriented trays on which the material or articles to be sintered or otherwise treated are placed. The circle of stacks of trays is surrounded by an outer heating zone comprising an outer ring of electrical heating elements. The outer heating zone is, in turn, surrounded by an outer wall of porous refractory insulation. The apparatus is enclosed in a water-cooled shell of heat resistant material.

15 Claims, 2 Drawing Sheets

SINTERING KILN

BACKGROUND OF THE INVENTION

1. Field of the Invention

This invention relates to a kiln, particularly suited for the sintering of base metal electrode capacitors.

2. Prior Art

Multi-layer ceramic capacitors have been used extensively as miniature high capacitance, high reliability components in a wide variety of electronic products. These capacitors generally comprise alternate layers of conductive metal (electrode) and dielectric, and may be prepared, for example, by alternate layering of an internal electrode-forming paste and a dielectric layer-forming paste, by sheeting, printing or similar techniques, followed by sintering. In the past, such capacitors were commonly formulated with electrode layer materials that could be sintered in air, for example, noble metal electrodes, such as palladium or palladium alloys. More recently, to avoid the high costs of the noble metals, it has become common practice to replace part, or all, of the noble metal with a relatively inexpensive base metal, such as nickel, or a nickel alloy. However, base metal electrodes (BME) capacitors cannot be easily sintered in air since the base metal oxidizes readily. On the other hand, the dielectric material, typically a ceramic, such as barium titanate cannot be sintered in a strong reducing atmosphere. Thus, a balance must be struck wherein no, or minimal, oxidation of the metal electrode material occurs and no, or minimal, reduction of the dielectric materials occurs. A typical firing cycle will include a sintering step, using a moderately reducing atmosphere, such as, a moist mixture of hydrogen and nitrogen ("forming gas"), followed by a re-oxidation step in which the temperature and oxygen partial pressure are adjusted to re-introduce oxygen into the now partially reduced dielectric while not excessively oxidizing the now sintered electrode. To accomplish this, both the sintering and the re-oxidation atmospheres require narrowly defined oxygen partial pressures, even distribution of the heated gas, and closely controlled temperatures. The kiln must be capable of meeting these requirements through the use of appropriate materials of construction, and a design that provides a carefully controlled flow rate, an even distribution of gas, and a carefully controlled temperature.

U.S. Pat. Nos. 4,241,378 and 4,097,911 disclose a method of making base metal electrode capacitors comprising, for example, alternating layers of nickel metal electrode and barium titanate dielectric, wherein the capacitors are fired in an atmosphere having a lowered partial pressure of oxygen followed by a re-oxidation step.

U.S. Pat. No. 4,517,155 discloses a method for applying copper base metal terminations on multi electrode ceramic capacitors by applying copper glass frit metalizations to the ends of a ceramic capacitor and firing in an atmosphere of nitrogen containing a controlled partial pressure of oxygen.

U.S. Pat. No. 3,414,661 discloses a high temperature furnace wherein the material(s) to be heated are placed on a platform or pedestal that can be moved through various temperature zones. The furnace may be operated at high temperatures, for example, as high as 3000°C in oxidizing atmospheres. The use of neutral or reducing atmospheres at high temperatures is also disclosed.

U.S. Pat. No. 3,619,466 discloses a high temperature electrically heated cylindrical radiation furnace having an adjustably sized heating zone formed by a plurality of arcuate heat-reflecting shields. During operation, gas is distributed through a gas diffuser plate.

U.S. Pat. Nos. 5,559,826 and 5,703,901 disclose a calcination furnace, electrically heated, optionally in combination with combustion heating. The furnace contains an adjustably-sized chamber for the placement of trays holding the units to be processed. Means are provided to control the circulation of the furnace atmosphere as well as the concentration of ingredients therein.

SUMMARY OF THE INVENTION

It is an object of this invention to provide an improved apparatus for the treatment of articles or materials in a controlled atmosphere.

It is a further object of this invention to provide an improved apparatus for sintering base metal capacitors.

It is a further object to provide a kiln for sintering base metal electrode capacitors wherein the kiln provides improvements in the evenness of distribution of gas and evenness of temperature.

These and other objects are accomplished in accordance with this invention, which relates to a sintering kiln, particularly suitable for sintering base metal electrode capacitors, comprising an inner zone having disposed therein, a multiplicity of vertically oriented gas dispersion conduits for the inlet and dispersion of gas and a multiplicity of vertically oriented electrical heating elements. Each gas dispersion conduit comprises a porous or perforated inner tube for the radial dispersion of gas along the length thereof and a porous or perforated outer tube for the radial dispersion of gas along the length thereof. The outer tube is concentrically positioned around the inner tube, forming an annular space between the inner tube and the outer tube. The annular space is filled with a porous refractory medium. The temperature of the inner zone is controlled by the electrical heating elements disposed therein. The gas is evenly heated as it passes radially from the inner tube through the porous refractory medium and then through the outer tube. Surrounding the inner zone is a multiplicity of stacks of substantially horizontally-oriented trays on which the material or articles to be sintered or otherwise heat-treated are placed. The circle of stacks of trays is surrounded by an outer heating zone comprising an outer ring of electrical heating elements. The outer heating zone is, in turn, surrounded by an outer wall of porous refractory insulation. The apparatus is enclosed in a shell of heat resistant material, such as refractory metal or ceramic. In a preferred embodiment, the temperature of the outer surrounding shell is controlled by a cooling means, preferably a water jacket.

In practice, base metal electrode capacitors, or other articles or materials to be sintered or otherwise heat-treated are placed on the trays. The porous refractory medium, preferably a bulk ceramic fiber, in the annular space, between the inner and outer tubes, is heated by the electric heaters in the inner zone and, in turn, imparts an even heat to the gas as it passes through the fibrous mass from the central gas inlet tube. The evenly heated gas then passes radially through the openings in the outer tube and across the trays to provide an evenly distributed sintering atmosphere to the capacitors, or other articles to be treated, on the trays. The gas then passes through the surrounding electrical heaters and then through the porous or perforated outer wall of refractory insulation. The gas may then be removed through an exhaust port in the surrounding shell and/or recycled through the gas inlet tube. The entering gas is heated primarily by the heaters in the inner zone. The load, that is the material or articles on the trays, is heated primarily by the outer circle of electrical heaters surrounding the stacks of trays.

The number of stacks of trays surrounding the inner zone may vary considerably. The trays are preferably rectangular in shape. For efficiency it is preferred to employ a sufficient number so that the inner ends of the trays, that is the ends closest to the inner zone, touch each other, or are very close to each other so that the heated gas from the inner zone will be directed primarily across the trays rather than between the stacks of trays. Thus the preferred number will vary according to the diameter of the inner zone and the size of the trays employed.

Materials of construction, especially those components that may have intimate contact with the gas employed, should be capable of withstanding the operating temperature and be as inert as possible to the gas. The kiln may be operated, for example, at temperatures of from about 300° C. to about 3000° C. Operation at temperatures at the high end of that range may require the use of construction materials, such as, graphite. More typically, for operations such as the sintering of base metal electrode capacitors, temperatures up to about 1400° may be employed. For such purposes, the inner and outer tubes may be constructed of a material such as mullite, $ZrO_2$, $SiO_2$ or $Al_2O_3$, or the like. Preferably, the electrical heating elements employed are $MoSi_2$, or SiC. If the latter is employed, it is preferred that the element be shielded with an appropriate inert non-porous shielding material, such as silica. The porous refractory medium within the annular space between the inner tube and the outer tube of the gas inlet tubes, is preferably a high temperature bulk ceramic fiber insulation, most preferably a very low iron ceramic fiber insulation. Other porous refractory media that may be employed include, for example, reticulated ceramic, coarse ceramic grain, e.g. silica, alumina, zirconia, natural sand and the like. If such granular ceramic is employed, the openings along the length of the inner and outer tubes would be made appropriately small or would be screened to keep the grains from passing through. The outer wall of porous refractory material may be, for example, a perforated firebrick or insulated firebrick, or the like, or most preferably a fibrous refractory, such as, a rigidized fiber-form material.

The number of electrical heating elements employed may vary, depending on the evenness of temperature desired. Typically, two to twelve heating elements, preferably 3 to 5, and most preferably three, are positioned equidistant from each other in the inner zone. The number of heating elements in the space surrounding the stacks of trays is preferably about nine to fifteen, and most preferably, twelve.

In a preferred embodiment, to further minimize temperature and gas concentration variations, the load, that is, the stacked trays containing the articles being treated, may be rotatable, for example, at rotational speed between about 0 and 10 RPM. Furthermore, the rotation of the trays may be used to position selected portions thereof at a convenient position for access, for example, for incremental loading and unloading.

Advantageously, to facilitate the special atmosphere operations, the sintering kiln of this invention may be provided with a vacuum system, to remove the air in the kiln, prior to initiating a treatment cycle, or to facilitate atmosphere changeover between different parts of the cycle. The vacuum system may be applied through the aforementioned exhaust port in the surrounding shell.

BRIEF DESCRIPTION OF THE DRAWINGS

The invention is further illustrated by the accompanying drawings wherein.

DETAILED DESCRIPTION OF THE INVENTION

Figure 1:
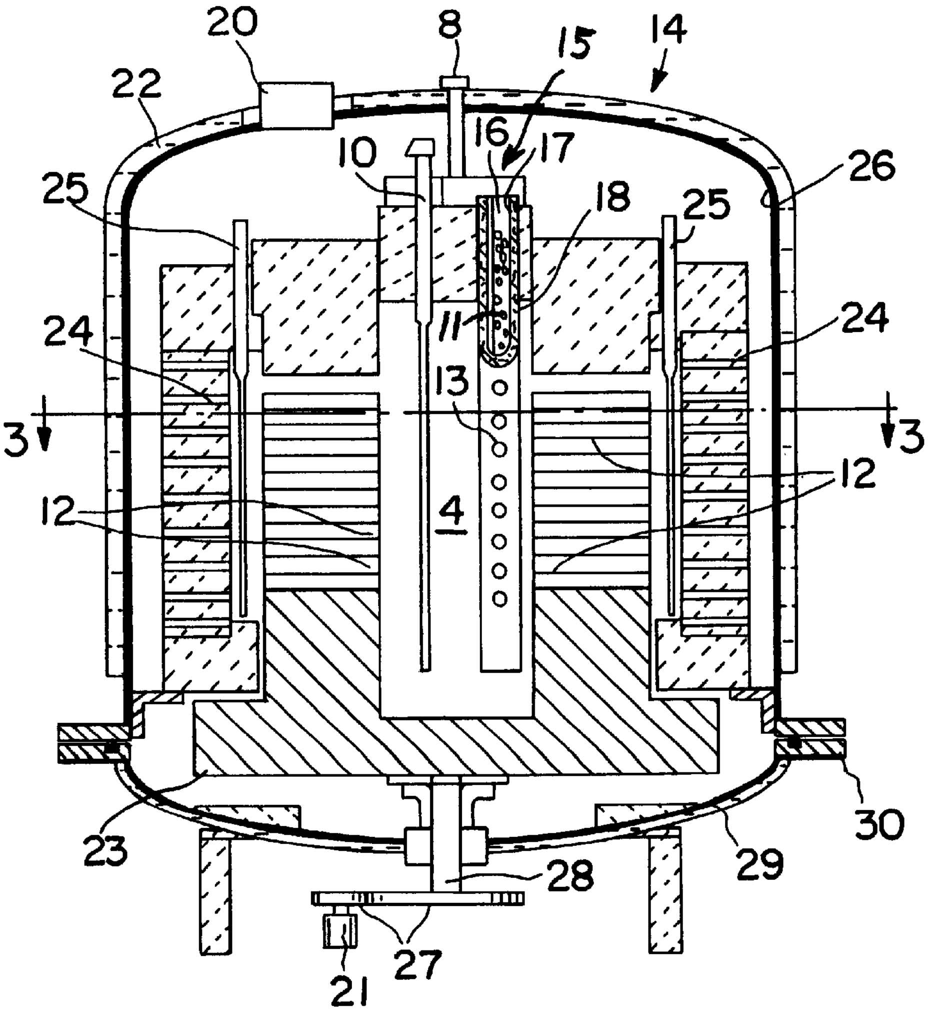
FIG. 1 is a vertical sectional view of a sintering kiln in accordance with the invention.
Figure 2:
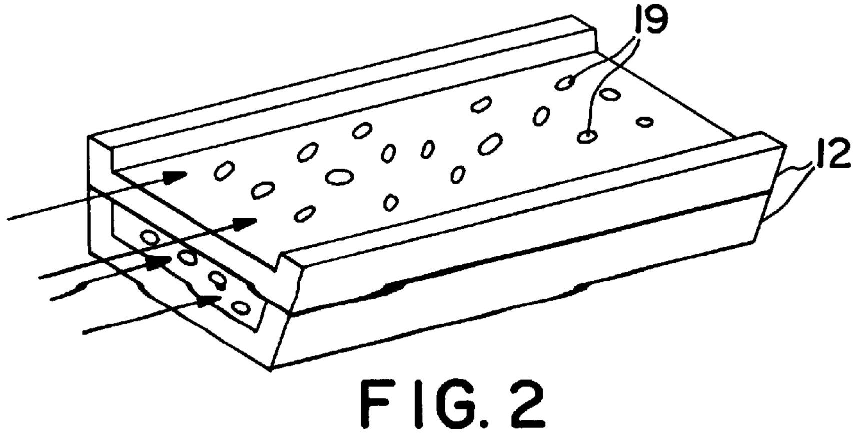
FIG. 2 is a perspective view of the trays of the sintering kiln of FIG. 1.
Figure 3:
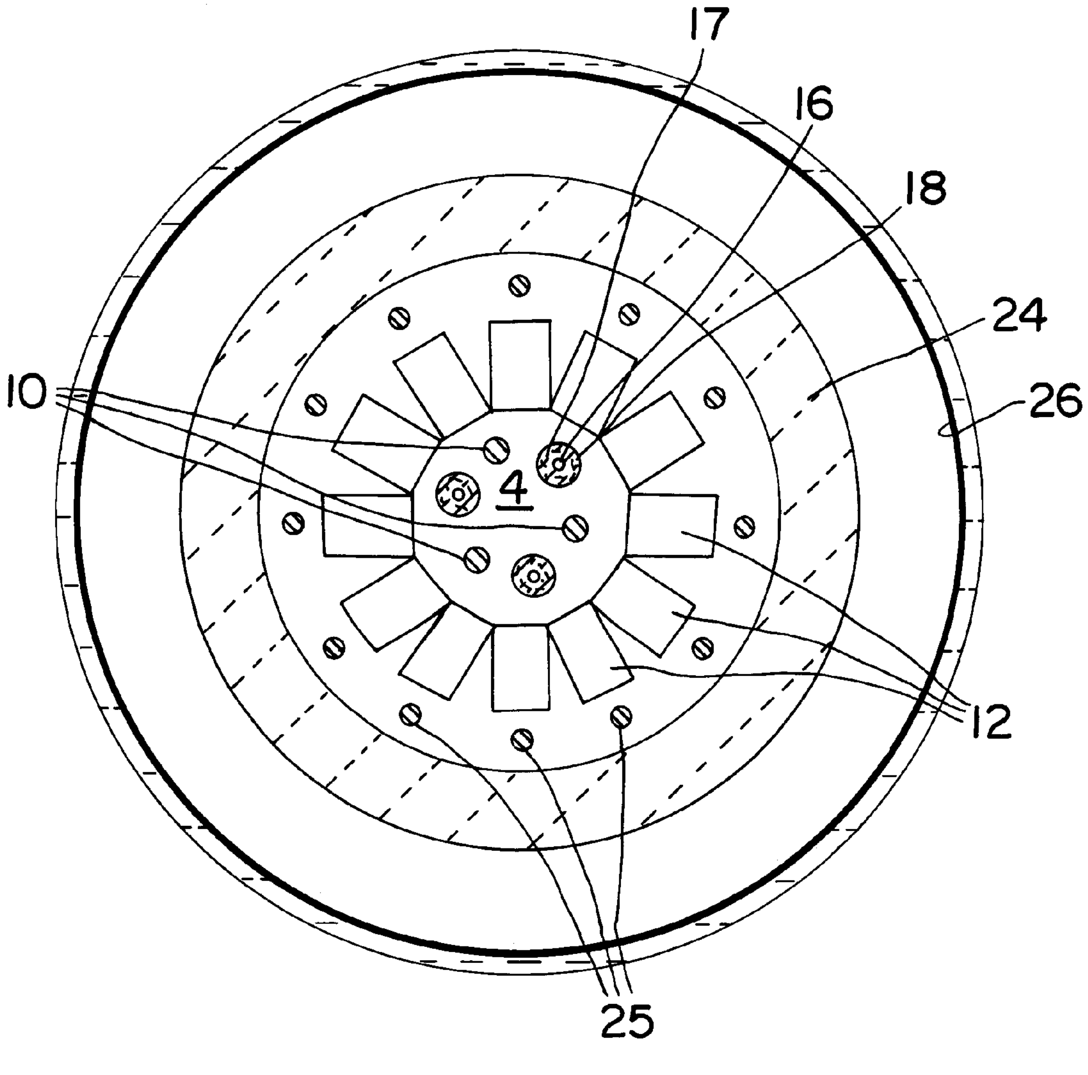
FIG. 3 is top cross-sectional view of the kiln of FIG. 1, taken along the line 3—3, showing the positioning of the trays and electrical heating elements.

The apparatus of the present invention, as illustrated in FIGS. 1, 2, and 3, includes an inner zone 4 having a multiplicity of vertically oriented gas dispersion conduits 15, adapted for the entry and radial dispersion of gas, and a multiplicity of vertically oriented electrical heating elements 10. The number of gas dispersion conduits 15 and electrical heating elements 10 in the inner zone may vary considerably, the preferred number of each being three, as shown in FIG. 3. (In FIG. 1, because of the sectional view depicted, only one of each can be seen.) Gas is supplied to the gas dispersion conduits 15 through gas inlet 8. Each gas dispersion conduit 15 comprises a porous or perforated inner tube 16 and a porous or perforated outer tube 18 concentrically positioned around the inner tube to form an annular space therebetween. The annular space between the inner tube 16 and the outer tube 18 contains a porous insulating medium 17, such as a glass or ceramic fiber. In the embodiment depicted in FIG. 1, each of the inner and outer tubes have multiple openings, 11 and 13 respectively, along the length thereof, for the radial passage of gas. The porous insulating medium 17 is heated by heating elements 10. The gas, radially dispersed from inner tube 16 through openings 11, is evenly heated as it passes through the porous insulating medium 17. The evenly heated gas then passes radially outward through openings 13 in outer tube 18, then through stacked trays 12 across the articles 19 being sintered or heat-treated. The stacked trays 12 holding the articles 19 to be treated, are positioned in an annular, or doughnut-shaped configuration around the inner zone 4.

The retention of heat and the even heating of the gas throughout the kiln is aided by outer electrical heating elements 25, and by a surrounding wall 24 of porous or perforated insulating material. The apparatus is enclosed in an outer shell 14 of heat resistant material. The outer shell 14 comprises an upper shell portion 26 attached by flanges 30 to lower shell portion 29 and having an exhaust port 20 for the removal or recycling of gas during a heat-treating cycle, or prior to a heat-treating cycle. During operation, the outer shell may be cooled, for example, with the aid of water jacket 22.

In a preferred embodiment, as a further aid in providing an even distribution of gas and heat during a heat-treating cycle, the base 23 and trays 12 may be rotated, for example, by driving means, such as motor 21, through gears 27 and shaft 28.

Although the invention has been described with reference to certain embodiments thereof, it will be appreciated by those skilled in the art that modifications and variations may be made without departing from the spirit and scope of the invention as defined in the appended claims.

What is claimed is:

1. A sintering kiln comprising:

an inner zone having disposed therein a multiplicity of vertically oriented gas dispersion conduits for the inlet and dispersion of gas and a multiplicity of vertically oriented electrical heating elements, each gas dispersion conduit comprising an inner tube having a series of openings along the length thereof for the radial dispersion of gas therefrom, and an outer tube concentrically positioned around said inner tube, forming an annular space therebetween, said outer tube having a series of openings along the length thereof for the radial dispersion of gas therefrom, said annular space being filled with a porous refractory medium;

a multiplicity of stacks of substantially horizontally-oriented trays surrounding the inner zone, each of said trays having an upper surface for the placement of products to be sintered, and positioned to allow a path for the passage of gas from said inner zone across the upper surface of the trays;

an outer ring of electrical heating elements surrounding said stacks of trays;

an outer wall of porous refractory insulation surrounding the outer ring of electrical heating elements; and a surrounding shell of heat resistant material.

2. A sintering kiln according to claim 1 having a driving means for the horizontal rotation of said stacked trays.

3. A sintering kiln according to claim 1 wherein the porous refractory medium within said annular space is a bulk ceramic or glass fiber insulation.

4. A sintering kiln according to claim 3 wherein three gas dispersion conduits are disposed within said inner zone.

5. A sintering kiln according to claim 4 wherein three electrical heating elements are positioned substantially equidistant from each other within said inner zone.

6. A sintering kiln according to claim 1 wherein said stacks of trays are surrounded by between about nine and fifteen electrical heating elements.

7. A sintering kiln according to claim 6 wherein said stacks of trays are surrounded by twelve electrical heating elements.

8. A sintering kiln according to claim 1 wherein the surrounding shell is of a heat resistant metal and comprises a separable upper shell portion and lower shell portion.

9. A sintering kiln according to claim 8 wherein the temperature of the surrounding shell is controlled by a cooling means.

10. A sintering kiln according to claim 9 wherein said cooling means is a water jacket.

11. A sintering kiln according to claim 10 having an exhaust port for the removal or recycling of gas.

12. A sintering kiln according to claim 2 wherein said trays are substantially rectangular and said stacks of trays are so positioned that inner corners of the trays in each stack are substantially touching the inner corners of the trays in adjacent stacks of trays.

13. A sintering kiln according to claim 1 wherein said outer wall of porous refractory insulation is a rigidized fibrous material.

14. A kiln for sintering base metal electrode capacitors comprising:

an inner zone having disposed therein from three to five vertically oriented dispersion conduits for the entrance and dispersion of gas and from three to five vertically oriented electrical heating elements, each gas dispersion conduit comprising an inner tube having a series of openings along the length thereof for the radial dispersion of gas therefrom, and an outer tube having a series of openings along the length thereof for the radial dispersion of gas therefrom, and a porous perforated outer tube for the radial dispersion of gas therefrom, said outer tube being concentrically positioned around said inner tube, forming an annular space therebetween, said annular space being filled with a bulk fiber refractory insulation;

a multiplicity of stacks of substantially horizontally-oriented trays forming a substantially closed circle surrounding the inner zone, each of said trays having an upper surface for the placement thereon of base metal electrode capacitors to be sintered, said trays being positioned to provide a radial path for the passage of gas from said inner zone across the upper surface of said trays;

an outer ring of vertically-oriented electrical heating elements surrounding said stacks of trays;

an outer wall of porous refractory insulation surrounding the outer ring of electrical heating elements;

an enclosing shell of heat resistant material comprising an upper shell portion and a removably attached lower shell portion, said enclosing shell being provided with a water jacket cooling means;

an exhaust port for the removal or recycling of gas; and a means for the horizontal rotation of said stacked trays.

15. An apparatus for the gaseous treatment of products comprising:

an inner zone having disposed therein a multiplicty of vertically oriented gas dispersion conduits for the inlet and radial dispersion of gas and a multiplicty of vertically oriented electrical heating elements, each gas dispersion conduit comprising a porous or perforated inner tube for the radial dispersion of gas therefrom, said outer tube being concentrically positioned around said inner tube, forming an annular space therebetween, said annular space being filled with a porous refractory medium;

a multiplicty of stacks of substantially horizontally-oriented trays surrounding the inner zone, each of said trays having an upper surface for the placement thereon of products to be treated, each of said trays being positioned to allow a path for the passage of gas from said inner zone across the upper surface of the trays;

an outer ring of vertically-oriented electrical heating elements surrounding said stacks of trays;

an outer wall of porous or refractory insulation surrounding the outer ring of electrical heating elements;

an enclosing shell of heat resistant material comprising a separable upper and lower shell portion;

an exhaust port for the removal or recycling of gas; and a means for the horizontal rotation of said stacked trays.

* * * * *